(12) United States Patent
Kaaden

(10) Patent No.: US 6,233,212 B1
(45) Date of Patent: May 15, 2001

(54) MONITORING AND ADJUSTING A MOTOR CURRENT IN A DISK DATA DRIVE TO OPTIMIZE A DISK ROTATION SPEED

(75) Inventor: Jürgen Kaaden, Villingen-Schwenningen (DE)

(73) Assignee: Deutsche Thomson-Brandt GmbH, Villingen-Schwenningen (DE)

( * ) Notice: Subject to any disclaimer, the term of this patent is extended or adjusted under 35 U.S.C. 154(b) by 0 days.

(21) Appl. No.: 09/453,836

(22) Filed: Dec. 2, 1999

(30) Foreign Application Priority Data

Dec. 3, 1998 (EP) .................................................. 98403032

(51) Int. Cl.$^7$ ....................................................... G11B 7/00
(52) U.S. Cl. ......................... 369/54; 369/124.01; 360/69
(58) Field of Search .................................. 369/47, 48, 49, 369/50, 54, 58, 59, 124.01, 44.25, 44.27, 44.28, 44.34, 44.41; 360/69, 75; 318/439, 607, 430, 254

(56) References Cited

U.S. PATENT DOCUMENTS

| | | | |
|---|---|---|---|
| 5,612,933 | 3/1997 | Iso et al. | 369/32 |
| 5,815,478 | 9/1998 | Kim | 369/50 |
| 5,854,719 | * 12/1998 | Ginosaur et al. | 369/58 X |

FOREIGN PATENT DOCUMENTS

| | | |
|---|---|---|
| 0821356A2 | 1/1998 | (EP) . |
| 0833328A2 | 4/1998 | (EP) . |
| WO98/27549 | 6/1998 | (WO) . |

OTHER PUBLICATIONS

Stan et al.: "Adaptive–speed algorithms for CD–ROM systems", IEEE Transactions on Consumer Electronics, vol. 42, No. 1, Feb. 1, 1996, pp. 43–51, XP000583556.
European Search Report citing the above–listed references: AA, AB, AM, AN, AO, and AR.

* cited by examiner

Primary Examiner—Muhammad Edun
(74) Attorney, Agent, or Firm—Joseph S. Tripoli; Paul P. Kiel

(57) ABSTRACT

A method for monitoring and adjusting a motor current in a disk data drive allows to adjust a rotation speed of a disk to be as high as possible in order to increase an overall performance of the disk data drive. It comprises measuring the value of the motor current fed to the motor for an actual value of the disk rotation speed, comparing the value of the motor current with a nominal value of motor current at the actual value of the disk rotation speed, increasing the disk rotation speed to a new actual value of the disk rotation speed if the value of the motor current is substantially equal to the nominal value of motor current.

20 Claims, 8 Drawing Sheets

MONITORING AND ADJUSTING A MOTOR CURRENT IN A DISK DATA DRIVE TO OPTIMIZE A DISK ROTATION SPEED

FIELD OF THE INVENTION

The present invention relates to a disk data drive and more precisely to optimizing a disk rotation speed in such a disk data drive.

BACKGROUND OF THE INVENTION

A disk data drive uses a disk shaped data carrier to read and/or write data. Examples of disk data drives may be optical, opto-magnetic or magnetic data drives. Typically such disk data drives allow to remove and insert optical (Compact Disks, Digital Versatile Disks), opto-magnetic and/or magnetic disks. The inserted disk is rotated inside the drive by means of a motor to which a motor current is fed. Once the disk is rotating data may be read from and/or written to the disk using appropriate reading and/or writing means.

A rate of data reading and/or writing, i.e., a quantity of information per unit of time read from and/or written to the disk is dependent on a disk rotation speed. More precisely the greater the disk rotation speed the greater the achievable rate of data reading and/or writing. Due to imperfections of the disk or of the disk data drive a high disk rotation speed may lead to vibrations or other problems which eventually result in data reading and/or writing errors. Therefore the disk rotation speed needs to be adjusted as high as possible but in a way that a tolerable number of reading and/or writing errors occurs.

SUMMARY OF THE INVENTION

The method for monitoring and adjusting a motor current in a disk data drive such to optimise a rotational speed of a disk actuated by a motor with said motor current according to the invention comprises the steps of a) driving the motor at a certain value of a first property,
b) measuring the value of a certain second property,
c) comparing the measured value of the second property to a nominal value of the second property for said first property,
d) keeping the value of the first property constant if the measured value deviates from the nominal value and
e) else changing the first property and continuing with step b). This method has the advantage, that the optimum rotational speed of a disk can be determined independent of the fact whether the disk can be read by the device or if it is unreadable. That means, directly after inserting the disk into the device the method according to the invention may be performed and delivers the optimum value of the rotational speed for said disk. That means, it is not necessary to adapt certain parameters of the device functions to the properties of the disk before the optimum rotational speed can be determined.

According to a first variant of the invention, it is started with a low value of the first property and the first property is kept constant only if the measured value exceeds the nominal value, else the value of the first property is increased. This has the advantage, that the method is started under safe conditions, that means under conditions, which are most likely below the optimum value of the first property. The device works without problems, e.g. such caused by eccentricity or bad flatness, under these conditions. The value of the first property is increased until the optimum, the maximum acceptable value of the first property is reached.

According to another variant of the invention, the method is started with a maximum value of the first property. This has the advantage, that in case of high quality disks, which exhibit only very small eccentricity, the optimum value might be reached much more quickly, because for these disks, the optimum value of the first property most likely does not deviate much from the maximum value. If, in average, more high quality disks are used than low quality disks, this variant of the inventive method most likely leads quickly to the desired result.

According to still another variant of the invention the method is started with a certain medium value of the first property which is afterwards increased or decreased depending on whether it exceeds or falls below a threshold being the nominal value. The further steps are similar as described above. This variant of the method has the advantage, that the medium value with which the method is started may be chosen to be a value which most likely equals the optimum value. This value might be determined by averaging the maximum acceptable values for a big number of different disks. In this case only very few steps will have to be performed to reach the optimum value. This means that the device, in average, will be available for the user very quickly after being turned on or after a new disk has been inserted.

According to a first solution of the invention the first property is the rotational speed of the motor while the second property is the motor current of the motor. This has the advantage, that usually the motor of such device is controlled to run at a certain rotational speed. In this case it is sufficient to add the possibility to measure the motor current in order to perform the inventive method. No changes of control devices or control strategy is necessary.

According to a second solution of the invention, the first property is the motor current while the second property is the rotational speed of the motor. This has the advantage, that the motor current may not exceed a maximum allowable value because it is regulated according to a predefined strategy. This leads to a limitation of energy consumption as well as to reduced wear of the device and thus to enlarged lifetime. Deviation of actual value and nominal value in this case has the opposite meaning of the one for the first solution.

Advantageously the value of the first property is kept constant if the actual value of the first property equals a maximum allowable value of the first property of the device independent of whether the criteria for the optimum value of the first property are already reached or not. This also has the advantage not to exceed the maximum allowable or desirable motor current or motor speed or disk speed, respectively. In case of a very good disk, exhibiting nearly no eccentricity and having good flatness, and in case of optimum conditions of the device the conditions of the method set for determination of optimum speed might not be reached before the maximum speed of the device is reached. By cutting off the increase of rotational speed or motor current, respectively, wear is reduced and thus lifetime of the device is increased.

Measuring the value of the second property advantageously includes measuring several samples of the second property and generating a mean value therefrom. Using a mean value has the advantage, that errors caused by erroneously detected extremely high or extremely low values do not have negative influence on the method. A further advantage lies in the fact that measurement can be started even before a stable state after switching to a different value of the first property is reached. Otherwise it would be necessary to wait until such stable state is surely reached. A further advantage lies in the fact that if the control characteristic is very fast, which includes that deviations around the mean value may exist for a certain prolonged time, even these deviations or oscillations are filtered out by generating the mean value.

According to a variant of the invention the value of the first property is reduced about a certain amount before being kept constant. This has the advantage, that the criteria for no longer increasing the value of the first property may well lie a little bit above the optimum value, as this value is reduced afterwards about said predefined certain amount. This means that the steps for changing the value of the first property might be taken relatively large because after having reached the criteria for optimum value the actual value is reduced for example about half the value about which the first property it was changed before. The large steps for changing the value of the first property which large steps are possible according this variant of the invention make possible even more quickly reaching the optimum value.

The inventive method is performed each time a different disk is inserted into the disk data drive. This has the advantage, that each disk which might have different eccentricity or flatness than the disk before and each insertion operation which also might cause an eccentric mounting of the disk with regard to the device, that means each situation in which the eccentricity most likely changes, is coped with and the value of the first property is adapted accordingly. In other cases, for example if the device was turned off but the disk was kept, or in case that just a long time passed without access to the disk usually no big changes in the eccentricity of the combination of disk and device take place. The number of times the method is performed is such reduced to a reasonable but not too high number.

Advantageously the method is also performed again if a certain condition is met. Such condition may be a certain time having elapsed after the last performance of the method. This has the advantage that changes which might happen during operation but without having changed the disk are compensated for. For example the device may have been exhibited to mechanical shocks e.g. if it is used at a portable device, for example in a laptop computer or in an automotive system. Such mechanical shocks may lead to a certain displacement of the disc with regard to its mounting which also may cause a changed eccentricity. Another condition may advantageously be the turning on of the device independent of whether the disk was changed or the same disk is kept. Here, too, external shocks or other influences might have changed the interconnection and thus the actual eccentricity.

Preferably the nominal value of the second property for a certain speed is the maximum advisable value of said second property corresponding to said value of said speed. This means that the nominal value can be taken as threshold value. Comparison is such made easy. Another possibility which is a little bit less easy to implement is that the ideal value for the second property is taken as the nominal value. In this case the comparison would mean, that an actual value lying within a certain range around the ideal value would be taken as correct and only values lying outside this allowable range would be taken as indication of excessive deviation from the optimum value.

According to the invention a method for normalizing stored nominal values of motor current for determined rotational speeds of a drive motor in a data drive comprises the steps of g) mounting the device with a defined load, h) adjusting the drive motor to a certain rotational speed, i) measuring the actual value of the motor current, k) comparing said actual value of the motor current to a stored nominal value of motor current for said certain rotational speed and l) correcting said stored nominal value of motor current if the actual value of the motor current deviates from said nominal value. The defined load may be a certain disk of defined eccentricity. Preferably the defined load is defined by the absence of a disk. In this case the motor runs without any load. This is advisable for normalizing, as each load mounted to the motor might be mounted in a slight eccentric or uneven way and thus would influence the result of the normalising process. Compared to the method for monitoring and adjusting the motor current described above, the nominal value differs, usually about a certain factor, from the nominal value of the normalizing method. Normalizing is done in order to adapt the nominal values used for the monitoring and adjusting method to changes of mechanical or electrical properties of the device. For example mechanical resistance of the bearings of the motor i.e. friction or dissipation might change with time and thus make necessary a higher motor current to reach the desired rotational speed compared to a new device. If such external changes would not be taken into account, the monitoring and adjusting method described above would lead to incorrect or less optimum results. The normalizing method uses a standard, that means no disk, to compare and if necessary amend stored nominal values. If the characteristic of the device is well known, it might be sufficient just to do one measurement and one correction according to which all other nominal values of motor current corresponding to different rotational speeds can be corrected correctly e.g. by calculation.

Advantageously the normalizing method steps are repeated for all nominal values usually used or for a certain number of such values to correct these nominal values. In case that less values are taken into account the missing ones may be calculated from the measured and corrected ones e.g. by interpolation. This has the advantage, that all nominal values stored are corrected according to the actual measurement to the standard. Even in case that the characteristic is unpredictable a correction, taking in account measured values for all nominal values, leads to correct nominal values.

In case that the actual value lies within a certain range around the respective nominal value, the nominal values are deemed to be correct and the normalizing process is stopped.

Advantageously correction of a nominal value comprises the steps of m) calculating an offset value by subtracting the nominal value from the actual value of the motor current, n) adding the offset value to the nominal value in order to obtain a corrected nominal value and o) storing the corrected nominal value.

In other words a solution to the described problem is according to one aspect of the invention seen in a method for monitoring and adjusting a motor current in a disk data drive such to optimize a rotation speed of a disk actuated by a motor fed with the motor current, comprising measuring the value of the motor current fed to the motor for an actual value of the disk rotation speed, comparing the value of the motor current with a nominal value of motor current at the actual value of the disk rotation speed, increasing the disk rotation speed to a new actual value of the disk rotation speed if the value of the motor current is substantially equal to the nominal value of motor current.

In a preferred embodiment the method comprises measuring a new value of the motor current fed to the motor for the new actual value of the disk rotation speed, comparing the new value of the motor current with a new nominal value of motor current at the new actual value of the disk rotation speed, adjusting the disk rotation speed to the actual value if the new value of the motor current is greater than the new nominal value of motor current.

In another preferred embodiment the method comprises obtaining a measure value of the motor current for a determined number of times, and averaging the measure values obtained.

Another solution to the described problem is according to the invention seen in a method for normalizing nominal values of motor current for determined rotation speeds of a drive motor in a data drive, comprising adjusting the drive motor to a first determined rotation speed, measuring a first value of the motor current, comparing the first value of the motor current with a first nominal value of motor current for the first determined rotation speed, correcting the first nominal value of motor current if the first value of the motor current is different from the first nominal value.

In a further preferred embodiment the method comprises stopping the drive motor if the first value of the motor current is substantially equal to the first nominal value of motor current.

In a further preferred embodiment the method comprises adjusting the drive to a second determined rotation speed, measuring a second value of the motor current, comparing the second value of the motor current with a second nominal value of motor current for the second determined rotation speed, correcting the second nominal value of motor current if the second value of the motor current is different from the second nominal value.

In a further preferred embodiment the method comprises calculating an offset value by subtracting the nominal value from the value of the motor current, adding the offset value to the nominal value to obtain a corrected nominal value, storing the corrected nominal value.

Still another solution to the described problem is according to another aspect of the invention seen in a method for monitoring and adjusting a motor current in a disk data drive such to optimize a rotation speed of a disk actuated by a motor fed with the motor current, comprising measuring the value of the disk rotation speed for an actual value of the motor current fed to the motor, comparing the value of the disk rotation speed with a nominal value of disk rotation speed at the actual value of the motor current, increasing the motor current to a new actual value of the motor current if the value of the disk rotation speed is substantially equal to the nominal value of disk rotation speed.

In a further preferred embodiment the method comprises measuring a new value of disk rotation speed for the new actual value of the motor current fed to the motor, comparing the new value of the disk rotation speed with a new nominal value of disk rotation speed at the new actual value of the motor current, adjusting the motor current to the actual value if the new value of the disk rotation speed is smaller than the new nominal value of disk rotation speed.

It is to be understood that changes or amendments lying within the capability of the skilled person do also lie within the scope of the invention. For example also the normalization method may be amended such that the current through the drive motor is adjusted while the rotational speed is measured. Normalization, too, may advantageously performed after each extraction of a disk for example.

In the following at least one way of carrying out the invention will be described in detail using examples and referring to the drawings, wherein

DETAILED DESCRIPTION OF PREFERED EMBODIMENTS

A relationship between motor current fed to the motor rotating the disk in the disk data drive, and a disk rotation speed may be expressed as a function which attributes determined values of motor current to determined disk rotation speeds. This function may be given as a curve or a table including the determined values in pairs of motor current and rotation speed values. The values delivered by the function may be called nominal motor current and rotation speed values.

It may be possible to use a motor current limitation to find a highest possible disk rotation speed, i.e. an optimized speed at which reading and/or writing errors occur in a tolerable number only. In a first place the motor current is set at a maximum value and the disk rotation speed is measured. If the disk rotation speed is smaller than an expected nominal disk rotation speed value for the maximum value of current according to the established function or if the expected nominal disk rotation speed value is obtained but may not be held constant then a new lower value of motor current is set and thus the disk rotation speed reduced. This is repeated until the disk rotation speed value becomes and remains substantially equal to the expected nominal disk rotation speed value for the value of the motor current used. This way of adjusting the current and measuring the disk rotation speed is based on the observation that if a higher motor current is required to achieve the expected nominal disk rotation speed than in the established function, then the disk or the disk/motor assembly has some imperfections, e.g. eccentricity or bad flatness of disk, which become a problem at the adjusted value of the motor current and cause a less efficient motor current consumption. The imperfections eventually cause reading and/or writing errors at the adjusted value of the motor current. A drawback of this method is that a relatively high current needs to be adjusted right at the beginning of finding the optimized disk rotation speed.

Figure 1:
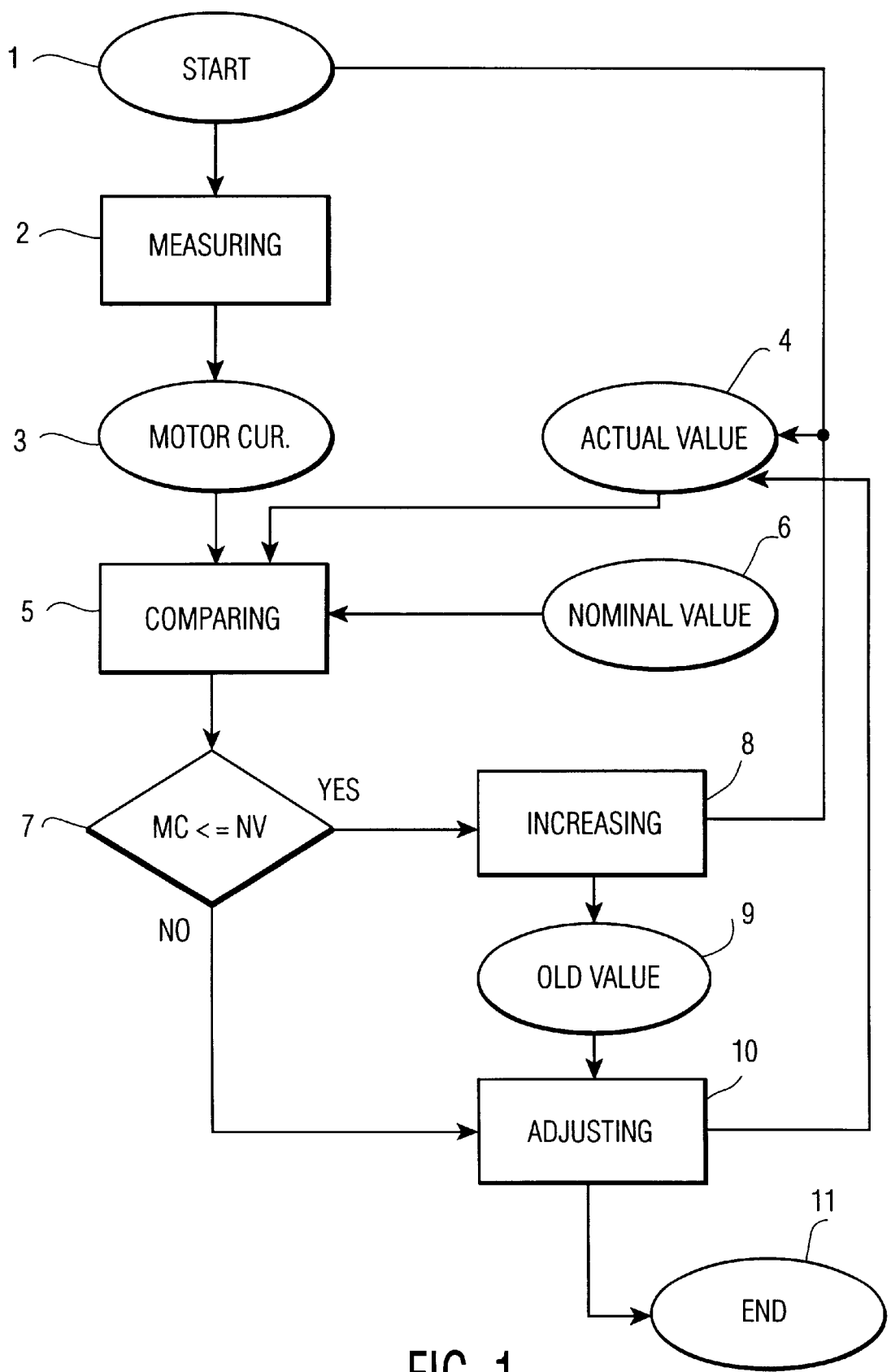
FIG. 1 contains a flowchart illustrating a method according to the invention.

In FIG. 1 a flowchart illustrates a method in which after a start 1 a value of motor current fed to the motor is measured in 2 to obtain a value 3 of motor current for an actual value of the disk rotation speed 4. A disk rotation speed and more precisely the actual value of the disk rotation speed 4 may be measured in many different ways, e.g., using data read from the disk or using tachometric information of the disk motor as is well known from a person skilled in the art. The value of motor current 3 may typically be obtained using a resistor and appropriate measuring equipment as is well known by a person skilled in the art.

A comparing 5 compares the value of motor current 3 with a nominal value of motor current 6 which should be flowing at the actual value of the disk rotation speed 4, i.e. with a nominal value of motor current obtained from the above mentioned established function. As explained above the nominal value of motor current may be obtained for example out of a table (not shown) or a curve (not shown). Other ways of obtaining the nominal value 6 are not excluded.

A case study 7 checks whether the value of the motor current 3 is substantially equal to the nominal value 6. If the case study 7 returns a positive result (YES) then an increasing 8 increases the disk rotation speed to a new actual value of disk rotation speed and the measuring 2 is initiated again using the new actual value of disk rotation speed in the comparing 5 to find a new nominal value of motor current.

Just before increasing the disk rotations speed to the new actual value, the actual value of disk rotation speed is stored as old speed value in 9.

If the case study 7 reveals negative (NO), i.e., the value of the motor current 3 is greater than the nominal value 6, an adjusting 10 uses the old speed value stored in 9, this value having previously been stored, and adjusts the disk rotation speed to the old speed value. At this point the method comes to an end 11. The adjusting 10 in fact results in a reducing of the motor current value which effectively reduces the disk rotation speed to a value at which possible imperfections do not affect the disk data drive anymore.

The described method allows to have an optimized disk rotation speed for any disk inserted in the disk data drive.

Figure 2:
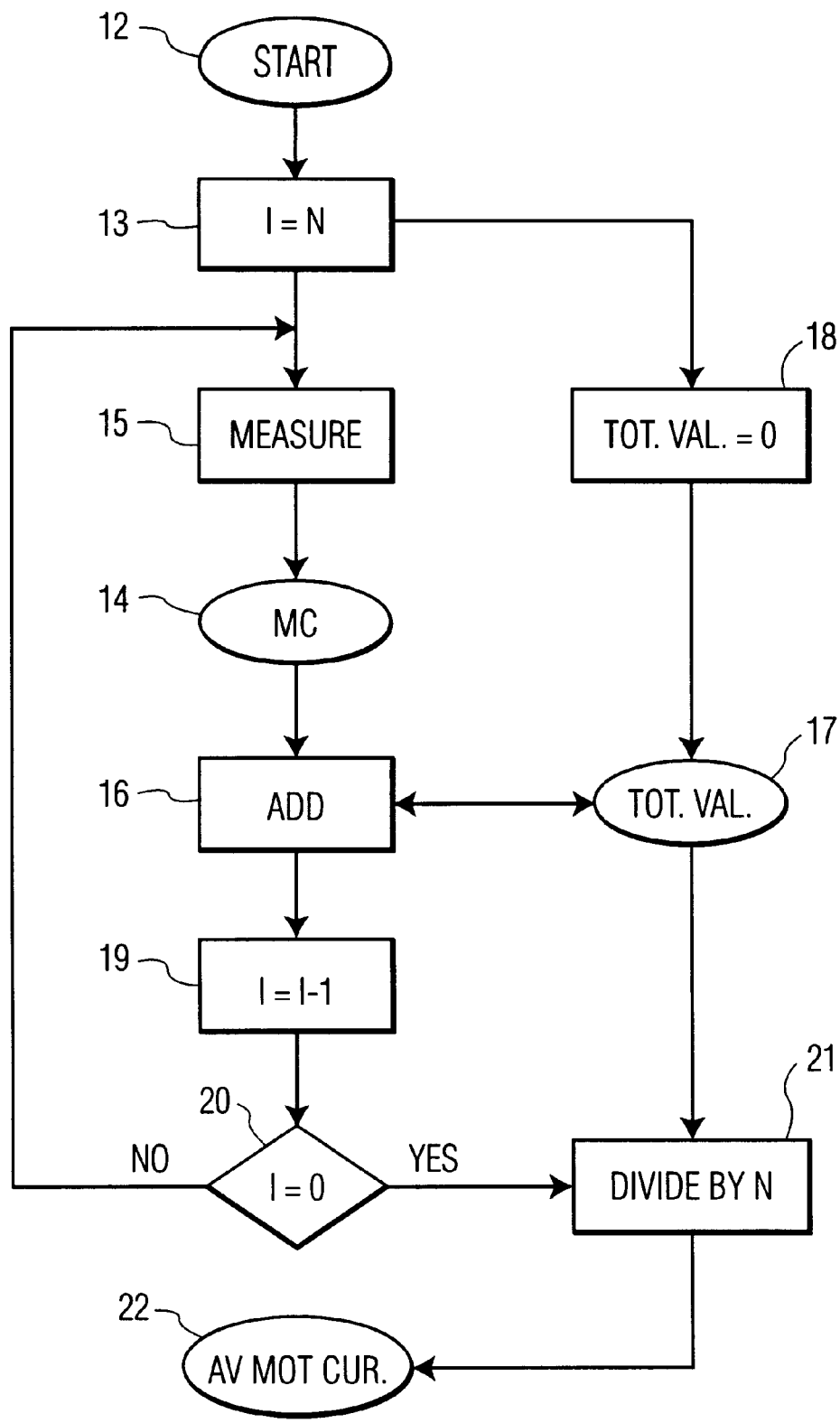
FIG. 2 contains a flowchart illustrating a method for averaging.

The measuring 2 may be realized as an average of a plurality of measures. Referring to FIG. 2 a start initiates a measuring in which a counter I is set to I=N in 13. A value of motor current 14 is obtained from a current measure 15 and added in 16 to a total measure value 17, the latter having been set equal to 0 by a reset 18 after start 12. In 19 the counter I is decreased by 1 by attributing I=I−1 and if in case study 20 I is not equal to 0 (NO) then the measuring 15 is undertaken again. If on the contrary the case study 20 reveals that I=0 (YES) then the total value 17 is divided by N in a dividing 21 to obtain an averaged motor current 22.

Other ways of averaging measures of motor current may well be used instead of the one described in connection with FIG. 2.

The established function between nominal values of motor current and disk rotation speeds may be stored in the disk data drive as nominal values. In order to take into account effects of for example an aging motor bearing on these nominal values, a normalization of the established function may be performed regularly. This way aging effects of the bearings may be taken into account. The normalization may for example be realized in a test mode during which the motor is rotated at several rotation speeds like 500, 1000, 1500 . . . rpm without a disk in the drive, and the value of motor current is measured at each speed. Offset values between the measured values of motor currents and nominal values stored, obtained by operating a subtraction of the two latter, are used to modify the stored nominal motor current values, e.g. by adding the offset values to the nominal values. Hence an influence from aging components of the disk data drive may be eliminated.

Figure 3:
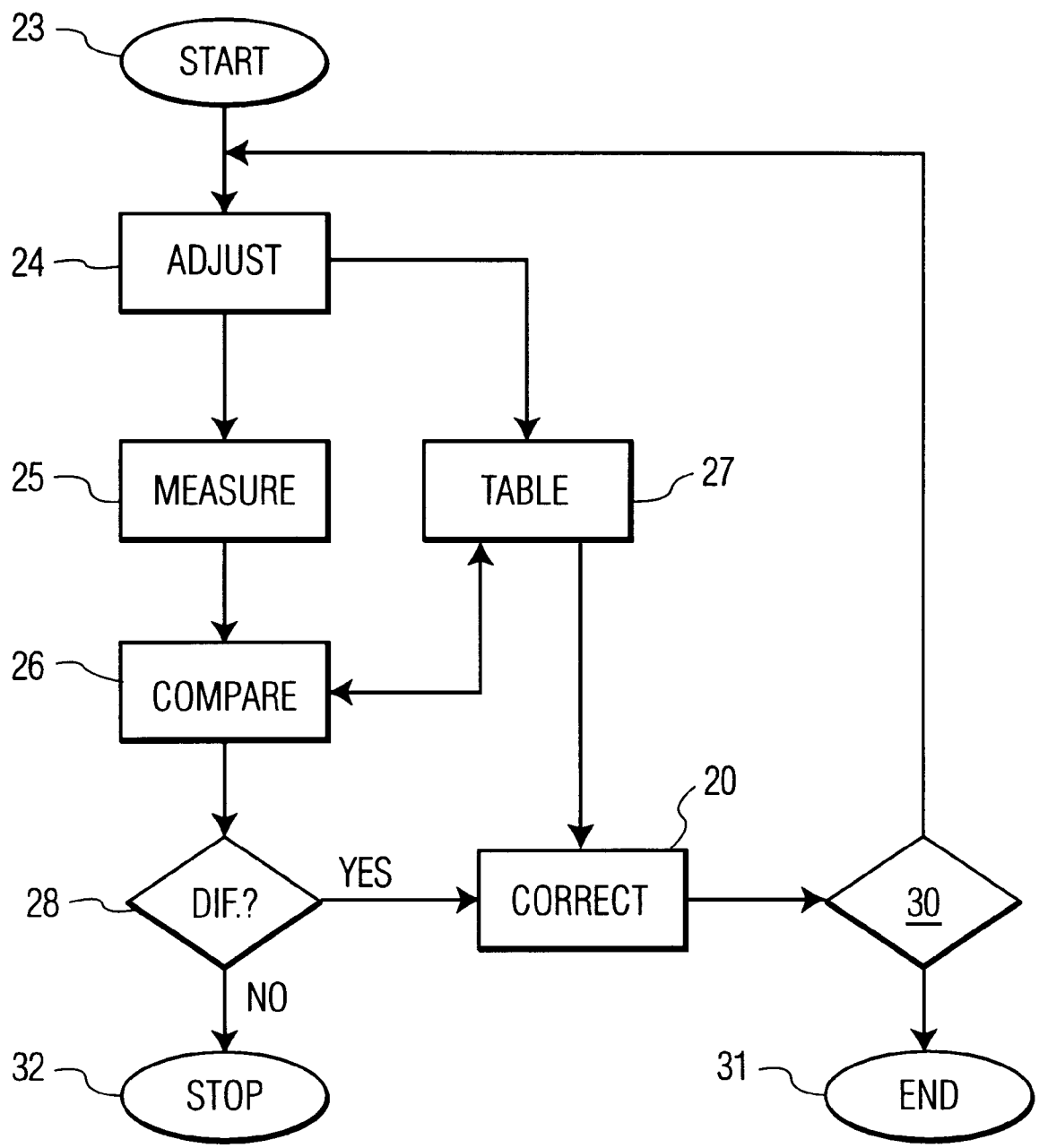
FIG. 3 contains a flowchart illustrating another aspect of a method according to the invention, FIG. 4 contains a flowchart illustrating still another aspect of a method according to the invention.

Referring now to FIG. 3 a start 23 initiates a method for normalizing in a data drive during which no disk is driven by the drive motor. A first determined rotation speed of the motor is adjusted in 24 followed by a measurement of the motor current in 25 in order to obtain a first value of the motor current. The latter is compared in 26 with a first nominal value of motor current extracted from a table 27 which contains values of nominal motor current associated to values of rotation speeds. If in case study 28 the first value and the first nominal value of motor current appear to be different (YES) then a correcting 29 of the nominal values stored in table 27 is undertaken and a second determined rotation speed is adjusted in 24.

A case study 30 checks if the adjusted rotation speed is equal to a final rotation speed value and ends the normalizing method if this is the case. This way a series of rotation speed values may be tested until the final rotation speed value has been checked.

If in case study 28 the first value and the first nominal value appear to be substantially equal (NO) then the normalization method is stopped in 32. This means that the nominal values of motor current need not be changed.

The methods described to this point adjust a rotation speed and measure a motor current which is subsequently compared to a nominal value of motor current. Another example of realization of the invention instead comprises adjusting a motor current value and measure a disk rotation speed which is subsequently compared to a nominal value of disk rotation speed.

Figure 4:
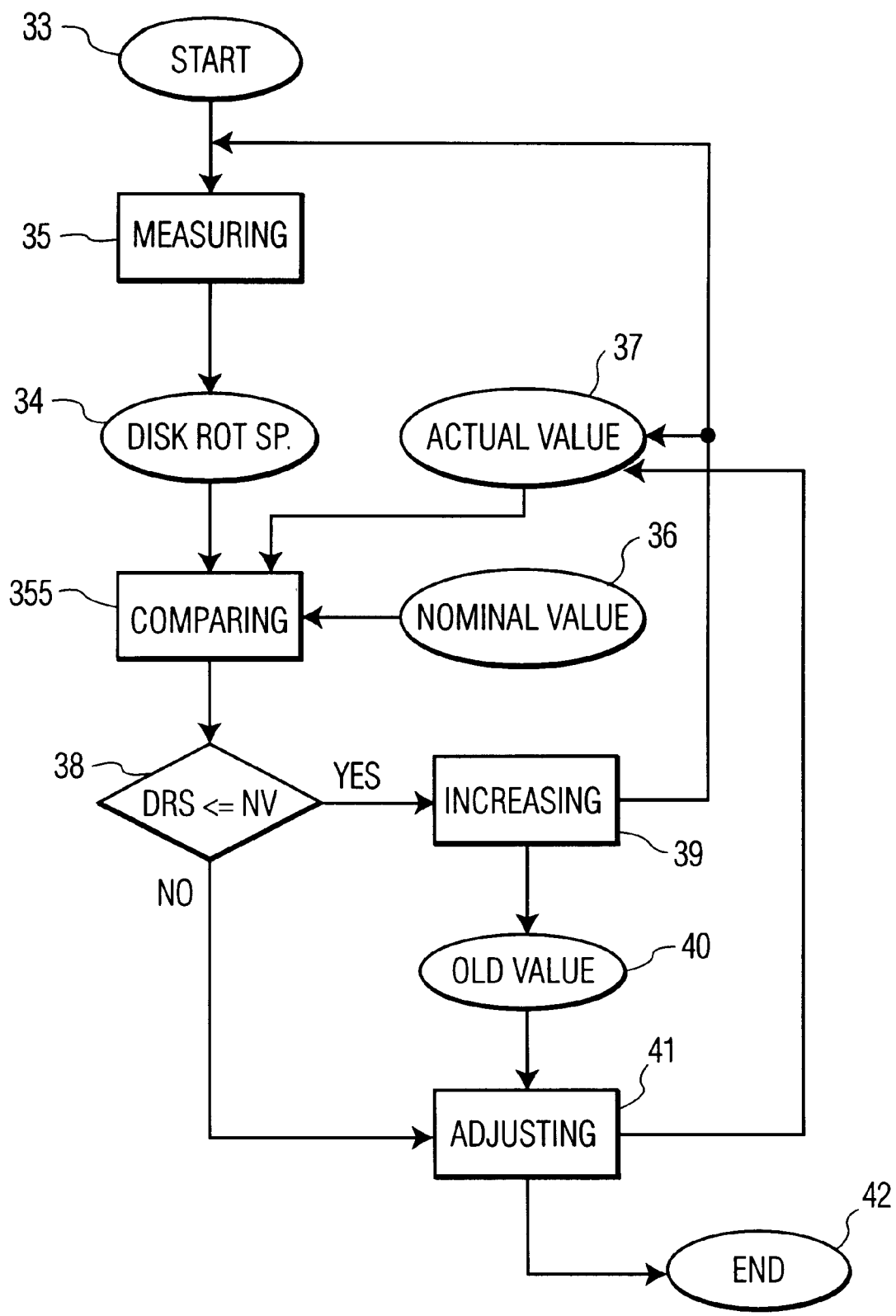

Referring now to FIG. 4. a method is started in 33 and a value of disk rotation speed 34 is measured in 35. A comparing 355 compares the disk rotation speed 34 with a nominal value of disk rotation speed 36 which one would expect for an actual value of the motor current 37 flowing through the drive motor.

If in a case study 38 the value of the disk rotation speed 34 and the nominal value of disk rotation speed 36 are found to be substantially equal (YES) then an increasing 39 of the motor current to a new actual value is undertaken, thus increasing the disk rotation speed. The latter is again measured in 35. At the issue of the increasing 39 the actual value of motor current is stored as old current value in 40. If the case study 38 reveals the value of the disk rotation speed 34 to be smaller (NO) than the nominal value of disk rotation speed 36, then an adjusting 41 adjusts a value of the motor current to the old current value 40 and the method ends in 42.

Figure 5:
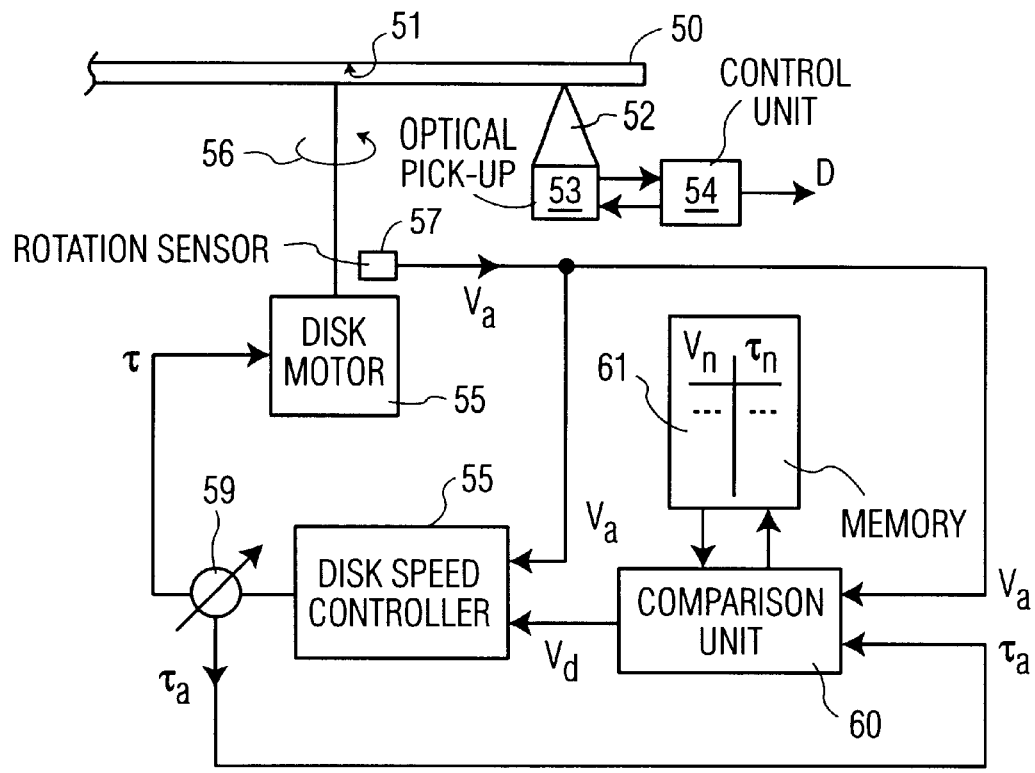
FIG. 5 shows a schematic view of a device for performing a method according to the invention.

FIG. 5 shows a diagrammatical view of a device for performing a method according to the invention. A disc 50 is shown as data carrier in cross-sectional view. Data is stored on the disk in a data carrying layer 51. Data carrying layer 51 is scanned by a beam of light 52, being produced and received by an optical pick-up 53. Optical pick-up 53 is controlled by and sends electrical signals to a control unit 54. Control unit 54 provides data D to be reproduced. Working of this part of the device is known to those skilled in the art and is thus not described in detail here.

Disk 50 is mounted to and driven by a disk motor 54. Disk motor 54 rotates the disk 50 which is indicated by arrow 56. The rotational speed $v_a$ which is also named the number of rotations is measured by a rotation sensor 57. The actual rotational speed signal $v_a$ is fed to a disk speed controller 58 which also receives a desired rotational speed signal $v_d$. Disk speed controller 58 provides a control signal to control the disk motor 54 upon which a disk motor driver, not further described here, provides an electric current I to disk motor 54. An amperemeter 59 provides for measuring the actual disk motor current $I_a$ which signal is fed to a comparison unit 60. Comparison unit 60 also receives the actual rotational speed signal $v_a$ and compares both values to respective pairs of nominal rotational speed $v_n$ and nominal disc motor current $I_n$ stored in a memory 61 depending on the result of the comparison according to the inventive method. Comparison unit 60 sets the desired rotational speed $v_d$ which is supplied to the disk speed controller 58.

Figure 6:
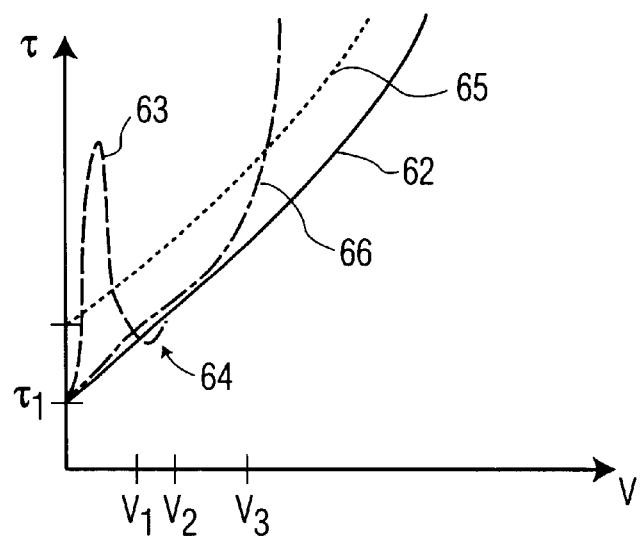
FIG. 6 shows a diagram motor current over rotational speed, FIG. 7 contains a flowchart illustrating a method for averaging, FIG. 8 contains a flowchart illustrating a method according to the invention, FIG. 9 contains a flowchart illustrating a method for averaging.

FIG. 6 shows a diagram indicating motor current I over rotational speed v. Line 62 shows the relationship of disk motor current I for different rotational speeds v in a standard situation. The curve starts for low rotational speeds approximately linearly and shows a higher increase or non-linear behaviour for larger rotational speeds v. Line 62 indicates the stable condition. In contrast thereto dashed line 63 indicates the starting behaviour for increasing the rotational speed from a low speed to a higher speed $v_2$. The disk motor current increases sharply short after the desired rotational speed signal $v_d$ was increased. The disk motor current I also decreases sharply when the motor is already accelerated and approaches $v_2$ and it most likely falls below line 62, see indication of arrow 64, before the final speed $v_2$ is reached. That means, if the rotational speed $_v$ was increased very slowly, the I(v) characteristic would closely follow line 62, whereas in reality, when acceleration to the new desired rotational speed $v_d$ is performed a characteristic similar to the one indicated by dashed lines 63 occurs. As in this case the actual motor current $I_a$ and the actual rotational speed $v_a$ do not necessarily lie on line 62 as long as the system has not again reached a stable state, comparison unit 60 should not start to do the comparison in order not to get incorrect results. That means comparison unit 60 should only start to compare after a stable state has been reached. According to one aspect of the invention a mean value of the actual values for $v_a$ and/or $I_a$ is generated in order to overcome shortcomings from starting the comparison even before stable state has been reached.

Dotted line 65 shows, as an example, how the normal characteristic indicated by line 62 might change in case of mechanical resistances e.g. caused by friction or dissipation of or at the disk motor 55 or other mechanically or electrical impacts on the system. The adjusting method according to the invention makes it possible to identify such deviation from the standard behaviour. In this case the nominal data $v_n$ and $I_n$ stored in memory 61, which usually complied to line 62 are amended accordingly and corrected nominal values $v_n$ and $I_n$ are stored to memory 61. In case of the more linear shift of line 62 to dotted line 64 it might be possible to just measure one point and to calculate all other points from the measured deviation. However, in case of non-linearity of the deviation it is desirable to do a measurement and a correction for each pair of nominal values $v_n$ and $I_n$, for example for each dot of dotted line 65. Dash-dotted line 66 shows the I(v) relation in case that a disk 50 exhibiting eccentricity is used in the device. For low speeds, as indicated by $v_1$ or $v_2$, dash-dotted line 66 shows nearly the same characteristic as line 64 but for increasing speeds it deviates therefrom. Approximately starting with speed $v_3$ the motor current increases extremely with increasing rotational speed as the high eccentricity causes a high need and thus a high loss of energy. For the example of dash-dotted line 66 the device would be adapted to the maximum speed $v_3$ until a different disk is used.

Figure 7:
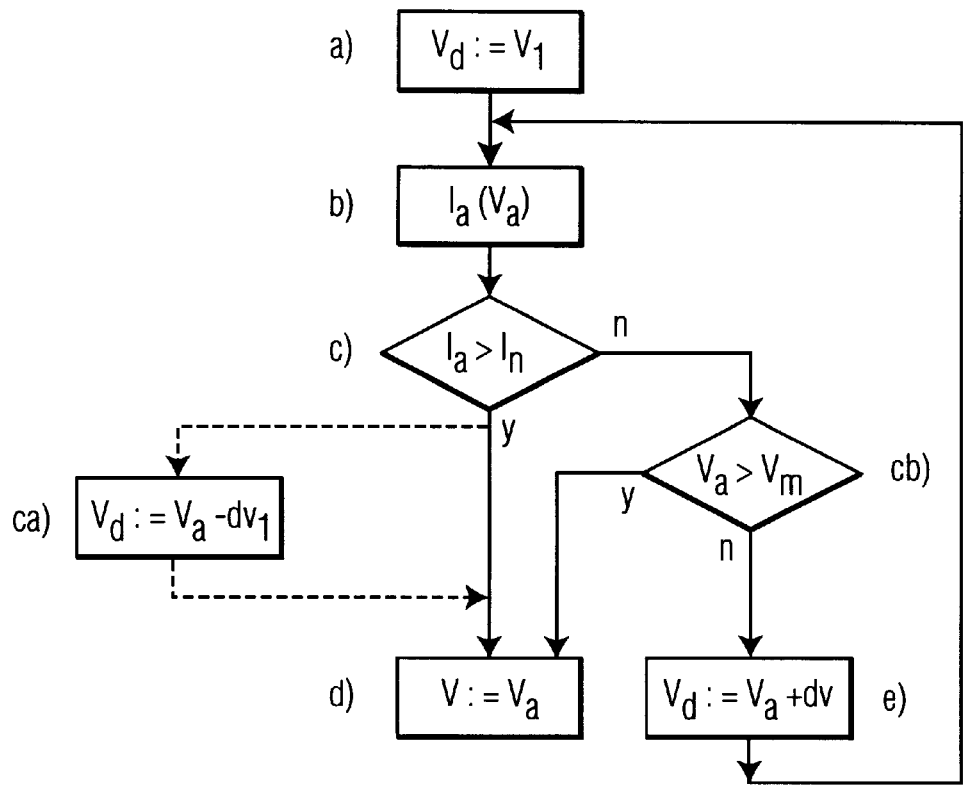

FIG. 7 shows a flowchart illustrating a method for monitoring and adjusting motor current I according to the invention. In step a) the desired rotational speed $v_d$ is set to an initial value $v_1$. In step b) the actual disk motor current $I_a$ for the actual rotational speed value $v_a$ is measured. In step c) a comparison of the actual disk motor current $I_a$ for the actual rotational speed $v_a$ to the nominal disk motor current In corresponding to the same rotational speed $v_a$ is done. In case that the measured actual value $I_a$ exceeds the nominal value $I_n$ the actual rotational speed $v_a$ is kept as the disk motor rotational speed v in step d). If the measured value $I_a$ does not exceed the nominal value $I_n$ it is branched to step e). In step e) the desired rotational speed $v_d$ is increased e.g. by adding a value dv to the actual rotational speed $v_a$. It is then returned to step b).

The optional step ca) which is to be performed, if desired, after a positive result in step c) is indicated in addition in FIG. 7. In step ca) the desired rotational speed is set to a lower value than the actual rotational speed $v_a$, for example by reducing the actual rotational speed $v_a$ by a difference dv1.

Another additional step cb), which is to be performed after a negative result of step c) is also indicated in FIG. 7. Here it is checked, whether the actual rotational speed $v_a$ equals or exceeds a maximum rotational speed $v_n$ for the device. In case of a positive outcome, it is branched to step d). That means that the rotational speed is not increased to higher values than the maximum rotational speed $v_n$ set for the device.

Figure 8:
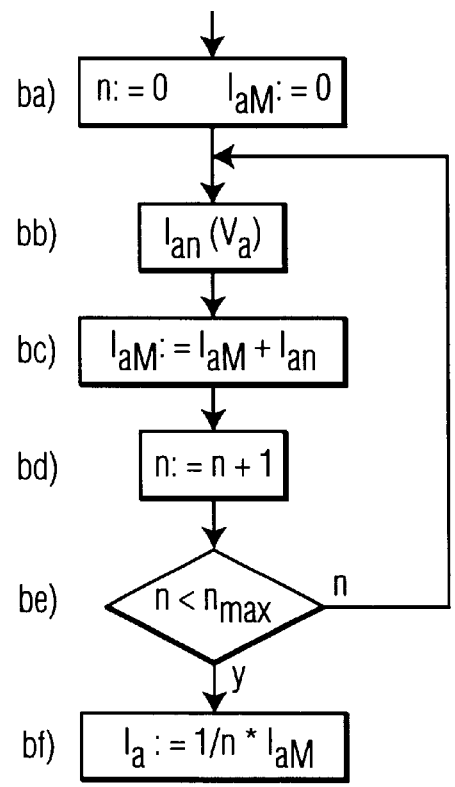

FIG. 8 shows a flowchart illustrating a method for averaging the measured value. These steps would replace step b) of FIG. 7. In step ba) a counting value n and a mean actual value of disk motor current $I_{aM}$ are reset to zero. In step bb) an n-th value of actual motor current $I_{an}$ for the actual rotational speed $v_a$ is measured. In step bc) a new value for actual mean current $I_{aM}$ is generated by adding the former actual mean value $I_{aM}$ and the actually measured value $I_{an}$. In step bd) the counting value n is increased by 1. In step be) the counting value is compared to a maximum counting value $n_{max}$. In case the maximum value is not reached it is returned to step bb), else step bf) is performed. In step bf) the actual disk motor current $I_a$ is set to be 1/n of the actual mean value of the disk motor current $I_{aM}$.

Figure 9:
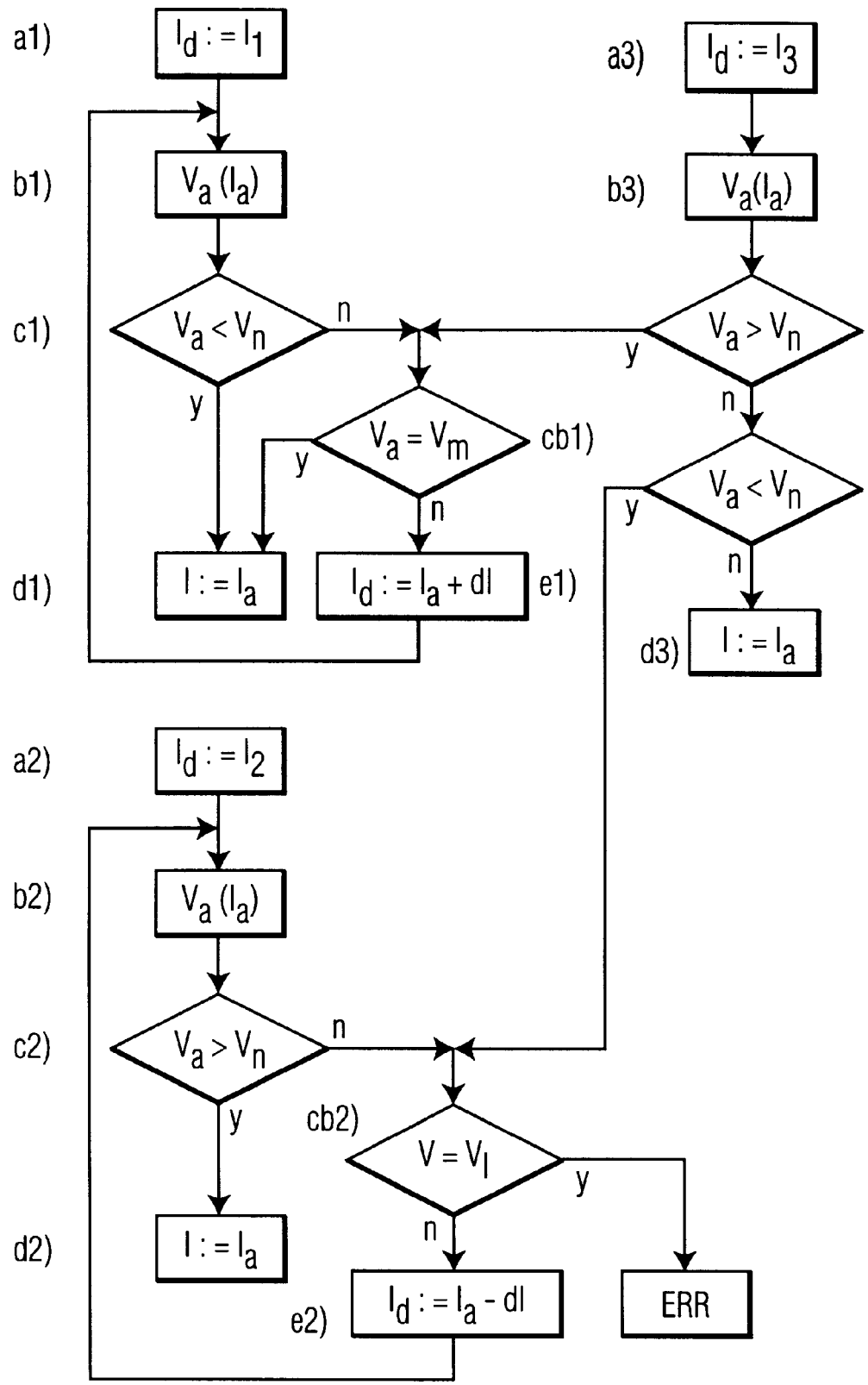

FIG. 9 shows a flowchart illustrating a further example of an inventive method. In this example the disk motor current I is set and the actual rotational speed $v_a$ is measured and compared to the nominal rotational speed $v_n$ corresponding to the actual disk motor current $I_a$. The upper left part of FIG. 9 shows a case in which it is started with a low value of the disk motor current I1 in step a1). In step b1) the actual rotational speed $v_a$ is measured. In step c1) the actual rotational speed $v_a$ is compared to the nominal rotational speed $v_n$ and the motor current I is kept constant in case that $v_a$ is smaller than $v_n$. Otherwise steps cb1) and e1), being similar to step cb) and e) of FIG. 7, are carried out. In step cb1) it is indicated the sign "equals 2", however, it is to be understood that also for rotational speeds $v_a$ exceeding $v_n$ it is branched to step d1).

In the lower part of FIG. 9 it is shown an example wherein it is started with a high value for the disk motor current $I_2$ in step a2) which current is successively decreased in step e2) by a difference value of the disk motor current dI. Steps b2), c2) and d2) are similar to the respective steps described above, except that in step c2) it is checked whether the actual rotational speed $v_a$ exceeds the nominal rotational speed $v_n$. In step cb2) the actual rotational speed $v_a$ is compared to a lowest acceptable rotational speed $v_l$. If $v_a$ equals or falls below this minimum rotational speed $v_l$ an error message is generated. Such a low rotational speed $v_l$ is one which usually does not occur. In case the actual rotational speed is lower than $v_l$ some error in the device must have happened, for example the disk may be mechanically blocked so that the disk motor 55 cannot rotate or can only rotate at an extremely low speed. In this case it is of no use to proceed further.

In the upper right part of FIG. 9 it is shown an example where it is started with a certain medium value of the disk motor current $I_3$ in step a3). The corresponding actual rotational speed $v_a$ is measured in step b3) and it is continued with step e2) in case the actual rotational speed $v_a$ exceeds the nominal rotational speed $v_n$ corresponding to disk motor current I3. If it falls below that value it is continued with step e2). In case that the rotational speed $v_a$ assumes the nominal rotational speed $v_n$ the actual disk motor current $I_a$ is kept in step d3).

It is to be noted, that not every advantageous feature is described for all the exemplary embodiments. However, it lies within the scope of the invention, to combine all advantages features or efficient amendments to any other solution of the invention.

Although the example of FIG. 9 is directed to control the disk motor 55 to assume a certain disk motor current I, it is obvious that a similar method may well be carried out for control regarding rotational speed v.

Figure 10:
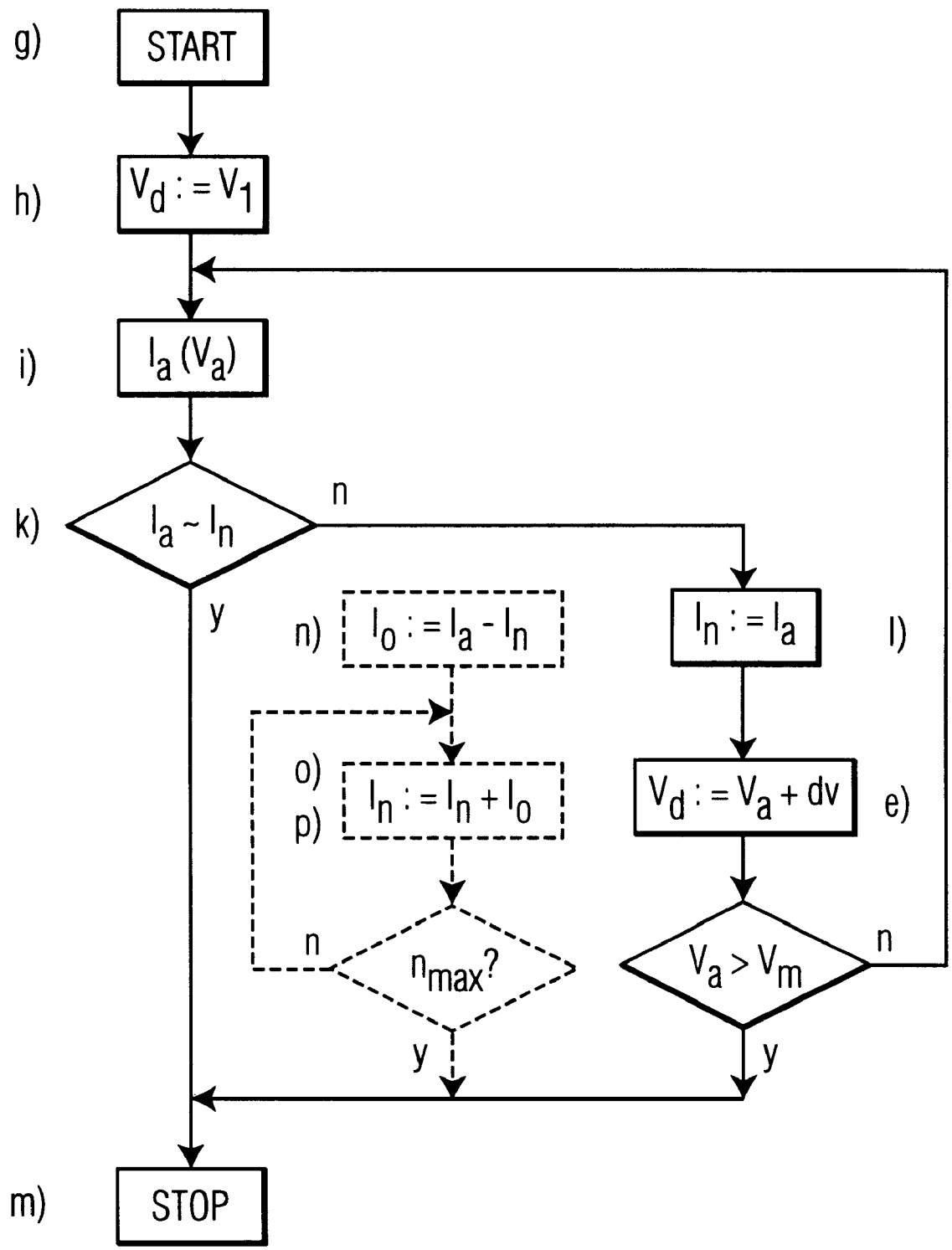
FIG. 10 shows a flowchart illustrating a method for normalizing according to the invention.

FIG. 10 shows a flowchart with regard to a method for normalizing nominal values of motor current In for determined rotational speeds $v_a$. The method starts at step g) with mounting a defined load to the device. In case of the example the defined load means that no disk is loaded. In step h) a desired rotational speed $v_d$ is set to an initial value $v_1$. In step i) the actual motor current $I_a$ needed to drive a disk motor 55 at rotational speed $v_a$ corresponding to $v_d$ is measured. In step k) is this checked whether actual current $I_a$ lies within a certain range around the nominal motor current $I_n$ for rotational speed $v_a$. If that is the case, the disk is stopped in step m) and the normalizing procedure is ended. Otherwise the nominal value $I_n$, stored in a memory, is set to assume the value of actual motor current $I_a$. In step e) the rotational speed is increased and it is returned to step i). This is repeated until the maximum speed is reached. In this case the method ends with step m).

An alternative method is shown by dashed lines. In step n) an offset current $I_o$ is determined by subtracting the nominal current $I_n$ from the actual current $I_a$. In steps o) and p) all stored nominal values $I_n$ are replaced by the offset value $I_o$ added to the old values $I_n$. After all values have been replaced the procedure is stopped with step n).

The described examples of methods according to the invention may particularly be used in optical disk drives in which relatively high rotation speeds of optical disks are desired but may not necessarily be achieved for any optical disk inserted since many optical disk have some kind of manufacturing imperfection. Such optical disk drives include for example DVD-ROM and DVD-RAM drives.

What is claimed, is:

1. Method for monitoring and adjusting a motor current in a disk data drive to optimise a rotational speed of a disk driven by a motor being driven with the motor current, the method comprising the steps of
   a) driving the motor at a certain value of a first property,
   b) measuring the value of a second property,
   c) comparing the measured value of the second property to a nominal value of the second property for the value of the first property, and
   d) keeping the value of the first property constant if the measured value deviates from the nominal value,
   e) else changing the value of the first property and continuing with step b.

2. Method according to claim 1, wherein
   in step a) the motor is started with a low value of the first property
   in step d) deviating means exceeding and
   in step e) changing means increasing.

3. Method according to claim 1, wherein
   in step a) the motor is started with a maximum value of the first property
   in step d) deviating means falling below and
   in step e) changing means decreasing.

4. Method according to claim 1, wherein
   in step a) the motor is started with a predetermined medium value of the first property
   if the comparison of step c) shows that the measured value exceeds the nominal value then the method is continued with step e) wherein changing means decreasing
   if the comparison of step c) shows that the measured value falls below the nominal value then the method is continued with step e) wherein changing means increasing
   else the value of the first property is kept constant.

5. Method according to claim 1, wherein the first property is the rotational speed of the motor while the second property is the motor current.

6. Method according to claim 1, wherein the first property is the motor current while the second property is the rotational speed of the motor.

7. Method according to claim 6, wherein
   in step a) the motor is started with a low value of the first property,
   in step d) deviating means falling below, and
   in step e) changing means increasing.

8. Method according to claim 6, wherein
   in step a) the motor is started with a maximum value of the first property,
   in step d) deviating means exceeding, and
   in step e) changing means increasing.

9. Method according to claim 6, wherein
   in step a) the motor is started with a predetermined medium value of the first property,
   if the comparison of step c) shows that the measured value falls below the nominal value then the method is continued with step e) wherein changing means decreasing,
   if the comparison of step c) shows that the measured value exceeds the nominal value then the method is continued with step e) wherein changing means increasing,
   else the value of the first property is kept constant.

10. Method according to claim 1, wherein the value of the first property is kept constant if the actual value of the first property equals a maximum value of the first property of the device.

11. Method according to claim 1, wherein the step of measuring the value of the second property includes measuring several samples of the second property and generating a mean value therefrom.

12. Method according to claim 1, wherein in step d) the value of the first property is reduced about a predetermined amount before being kept constant.

13. Method according to claim 1, wherein steps a)–e) are performed each time a different disk is inserted into the disk data drive.

14. Method according to claim 1, wherein the steps a)–e) are performed again if a predetermined time period has elapsed since a last performance of steps a)–e).

15. Method according to claim 1, wherein the nominal value of the second property for a certain value of the first property is the maximum advisable value of the second property for the certain value of the first property.

16. Method according to claim 1, wherein the steps a)–e) are performed each time the disk data drive is turned ON.

17. Method for normalizing nominal values of motor current for determined rotational speeds of a drive motor in a data drive device comprising the steps of a) mounting the device with a defined load, h) adjusting the drive motor to a certain rotational speed, b) measuring the actual value of the motor current, c) comparing the actual value of a motor current to a nominal value of motor current for the certain rotational speed, and d) correcting the nominal value of motor current if the actual value of the motor current deviates from the nominal value.

18. Method according to claim 17, wherein steps a)–e) are repeated for a predetermined number of different values of rotational speed lying between a minimum value and a maximum value of rotational speed.

19. Method according to claim 17, comprising the additional step of e) stopping the drive motor if the actual value of the motor current is substantially equal to the nominal value of the motor current.

20. Method according to claim 17, wherein the correcting step comprises the steps of calculating an offset value by subtracting the nominal value from the actual value of the motor current, adding the offset value to the nominal value to obtain a corrected nominal value, and storing the corrected nominal value.

* * * * *